United States Patent [19]  [11] 3,966,354
Patterson  [45] June 29, 1976

[54] THERMAL ACTUATED VALVE FOR CLEARANCE CONTROL

[75] Inventor: William R. Patterson, Cincinnati, Ohio

[73] Assignee: General Electric Company, Cincinnati, Ohio

[22] Filed: Dec. 19, 1974

[21] Appl. No.: 534,551

[52] U.S. Cl. .............................. 415/116; 415/134; 60/39.32
[51] Int. Cl.² .................... F01D 25/12; F01D 25/14
[58] Field of Search ............ 415/12, 115, 116, 117, 415/134, 135, ; 60/39.32; 236/93 R, 101 R

[56] References Cited
UNITED STATES PATENTS

| | | | |
|---|---|---|---|
| 2,977,090 | 3/1961 | McCarty et al. | 236/93 |
| 3,146,992 | 9/1964 | Farrell | 415/12 |
| 3,575,528 | 4/1971 | Beam et al. | 415/12 |
| 3,583,824 | 6/1971 | Smuland et al. | 415/134 |
| 3,736,069 | 5/1973 | Beam et al. | 415/115 |
| 3,828,365 | 7/1974 | Peng | 415/116 |

Primary Examiner—Carlton R. Croyle
Assistant Examiner—L. T. Casaregola
Attorney, Agent, or Firm—Dana F. Bigelow; Derek P. Lawrence

[57] ABSTRACT

A shroud closely surronding a high thermal inertia rotor is provided with a support structure having low thermal inertia characteristics. The support structure is selectively exposed to different temperature mediums during transient operation by way of a thermal actuated valve so as to cause a rapid growth thereof during periods of engine acceleration and a slow shrinkage thereof during periods of deceleration of the engine. In this manner the clearance relationship between the shroud and enclosed rotor is maintained at a minimum during periods of steady-state and transitional operation to thereby increase the efficiency of the combination.

13 Claims, 2 Drawing Figures

THERMAL ACTUATED VALVE FOR CLEARANCE CONTROL

The invention herein described was made in the course of or under a contract, or subcontract thereunder, with the United States Department of the Air Force.

BACKGROUND OF THE INVENTION

This invention relates generally to gas turbine engines and, more particularly, to a thermally actuated control arrangement for maintaining minimum clearance between a rotor and surrounding shroud.

In an effort to maintain a high degree of efficiency, manufacturers of turbine engines have strived to maintain the closest possible clearance between the engine rotor and the surrounding stator structure, since any gas which may pass therebetween represents a loss of energy to the system. If a system were to operate only under steady-state conditions, it would be a simple matter to establish the desired close clearance relationship between the rotor and the stator to obtain the greatest possible efficiency without allowing frictional interference between the elements. However, in reality, all turbine engines must initially be brought from a standstill condition up to the steady-state speed, and then eventually decelerate to the standstill condition. This transitional operation is not compatible with the ideal low clearance condition just described since the variation in rotor speed also causes a variation in the size thereof because of mechanical expansion caused by centrifugal forces. The stationary stator, of course, does not grow mechanically and there is, therefore, relative mechanical growth between the two structures during periods of transitional operation. Further, as the turbine engine is brought up to speed from a standstill position, the temperature of the gas passing therethrough is increased proportionately, thereby exposing both the rotor and the stator to variable temperature conditions. These conditions cause thermal growth of the two structures, and if the two structures have different thermal coefficients of expansion, which is generally true, then there is also the occurrence of relative thermal expansion between the elements. Characteristically, a rotor is necessarily a large mass element which allows it to rotate at very high speeds, thereby inherently yielding a very slow thermal response (high thermal inertia). On the other hand, the stator is a stationary element and preferably has a high thermal response (low thermal inertia) to allow for thermal growth of the stator during periods of acceleration to accommodate the mechanical growth of the rotor during those periods.

In many turbine engine applications, there is a requirement to operate at variable steady-state speeds, and to transit between those speeds as desired in the regular course of operation. For example, in a jet engine of the type used to power aircraft, it is necessary that the operator be able to transit to any desired speed whenever he chooses. The resulting temperature and rotor speed changes therefore bring about attendant relative growth between the rotor and stator which must be accommodated for. As mentioned hereinbefore, a primary concern is to maintain the minimum clearance between the stator and rotor of the engine while preventing any frictional interference therebetween.

A typical cycle through which an aircraft jet engine operates begins with a "cold rotor burst" by which the engine transits from an idle operating condition to a maximum speed condition. The high thermal inertia rotor quickly grows by reason of its mechanical expansion, and slowly grows thereafter because of thermal expansion, until it reaches a steady-state diameter. The stator, on the other hand, grows quickly because of its relatively lower thermal inertia, to thereby provide room in which to allow the rotor to grow. Assuming that the jet engine reaches a steady-state maximum speed operating condition, the next speed transition may come about by a "throttle chop", by which the engine is again brought back to idle speed. When this occurs, the rotor immediately and quickly shrinks mechanically, and then continues to slowly shrink by reason of the change in temperature. The stator, on the other, hand experiences no mechanical shrinkage but begins to thermally shrink at a relatively fast speed. If the operation now calls for maximum throttle at the time the stator reaches its steady-state, reduced size, then the rotor will immediately mechanically expand to a larger size than when it experienced a "cold rotor burst." Since the stator has shrunk faster and farther than the rotor, it is during this period of operation that the clearance between the two elements is at a minimum and is therefore a critical criteria for the design of an aircraft jet engine. If the thermal response of the stator is reduced to cause a slower shrinkage thereof, and thereby accommodates a slower shrinkage of the rotor, then the required quicker expansion characteristics during periods of acceleration would be hampered. For example, if after the "throttle chop", the throttle is again brought up to maximum speed (hot rotor burst), then the stator must be capable of quickly expanding to accommodate the mechanical expansion of the rotor.

It is therefore an object of this invention to provide a gas turbine engine which is capable of transiting between various speeds while maintaining an allowable clearance between its rotor and stator.

Another object of this invention is to provide a high speed gas turbine engine with high efficiency characteristics during both steady-state and transitional operation.

Yet another object of this invention is to provide a gas turbine engine capable of operating over a variable speed schedule without attendant interference between the rotor and stator.

These objects and other features and advantages become more readily apparent upon reference to the following description when taken in conjunction with the appended drawings.

SUMMARY OF THE INVENTION

Briefly, in accordance with one aspect of the invention, the shroud of a gas turbine engine is connected to and supported by a radially outwardly disposed shroud support structure which grows and shrinks in response to the temperature to which it is exposed. The temperature of the support structure is varied in a predetermined manner by its fluid communication with an air supply from the engine compressor. Because of the inherent characteristics of a gas turbine engine, the temperature of the gas supply will vary in proportion to the speed of the engine. Further, a thermally actuated valve interacts with the air supply and the support structure such that during periods of engine acceleration there is a free flow of air supply to the support structure, and during periods of deceleration the support structure is relatively isolated from the flow of the air supply. In this way, when the engine accelerates by the way of a throttle burst, a thermally actuated valve opens and allows the hot air to fully communicate with the support structure and thereby cause it to expand in the relatively quick manner. Subsequently, when the engine decelerates as by a throttle chop, the air supply temperature drops, the valve closes, and the support structure is relatively isolated therefrom so as to tend to remain at the higher temperature and thereby shrink at a slower rate than which it expanded. The relative growth between the stator and rotor structure is thereby reduced to a minimum during engine transitional periods.

By another aspect of the invention, the thermally actuated valve comprises a high thermal expansion cylinder which is exposed to the air supply and interacts with the support structure to open and close a radial gap therebetween in response to the air supply temperature change. One end of the cylinder is rigidly connected to a low thermal expansion material, and the other end thereof is free to expand and contract to define the valve gap. The growth of the cylinder free-end is then responsive to the air supply temperature but is accentuated by the fact that the other end is rigidly held so as to prevent growth thereof.

In the drawings as hereinafter described, the preferred embodiment is depicted; however, various other modifications and alternate constructions can be made thereto without departing from the true spirit and scope of the invention.

DESCRIPTION OF THE PREFERRED EMBODIMENT

Figure 1:
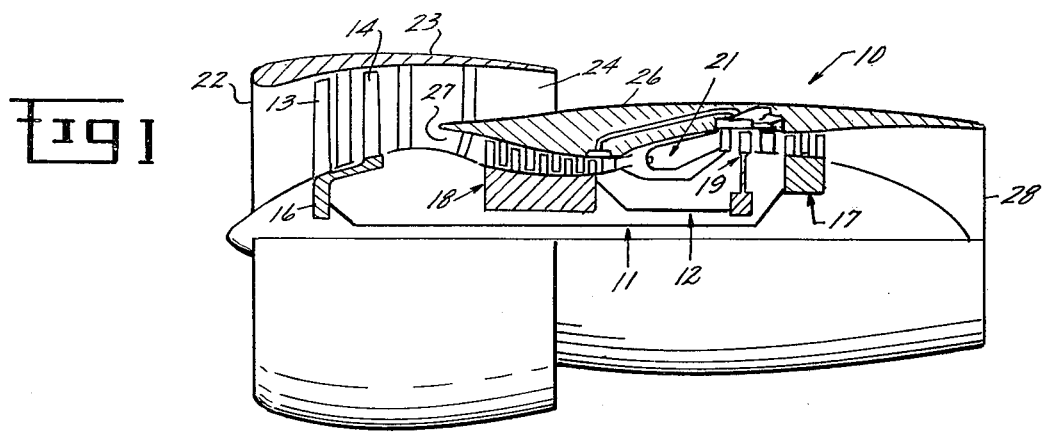
FIG. 1 is a schematic representation of a jet engine in which the present invention in embodied.

Referring now to FIG. 1, a turbofan engine 10 is shown to include a fan rotor 11 and a core engine rotor 12. The fan rotor 11 includes a plurality of fan blades 13 and 14 mounted for rotation on a disc 16. The fan rotor 11 also includes a low pressure or fan turbine 17, which drives the fan disc 16 in a well-known manner. The core engine rotor 12 includes a compressor 18 and a power or high pressure turbine 19 which drives the compressor 18. The core engine also includes a combustion system 21, which combines a fuel with the air flow and ignites the mixture to inject thermal energy into the system.

In operation, air enters the gas turbine engine 10 through an air inlet 22 provided by means of a suitable cowling or nacelle 23 which surrounds the fan rotor 11. Air entering the inlet 22 is compressed by means of the rotation of the fan blades 13 and 14 and thereafter is split between an annular passageway 24 defined by the nacelle 23 and an engine casing 26, and a core engine passageway 27 having its external boundary defined by the engine casing 26. The pressurized air which enters the core engine passageway 27 is further pressurized by means of the compressor 18 and is thereafter ignited along with high energy fuel in the combustion system 21. This highly energized gas stream then flows through the high pressure turbine 19 to drive the compressor 18 and thereafter through the fan turbine 17 to drive the fan rotor disc 16. The gas is then passed out the main nozzle 28 to provide propulsion forces to the engine in a manner well known in the art. Additional propulsive force is gained by the exhaust-pressurized air from the annular passage 24.

It should be noted that although the present description is limited to an aircraft gas turbine engine, the present invention may be applicable to any gas turbine engine power plant such as that used for marine and industrial applications. The description of the engine shown in FIG. 1 is thus merely illustrative of the type of engine to which the present invention is applicable.

Figure 2:
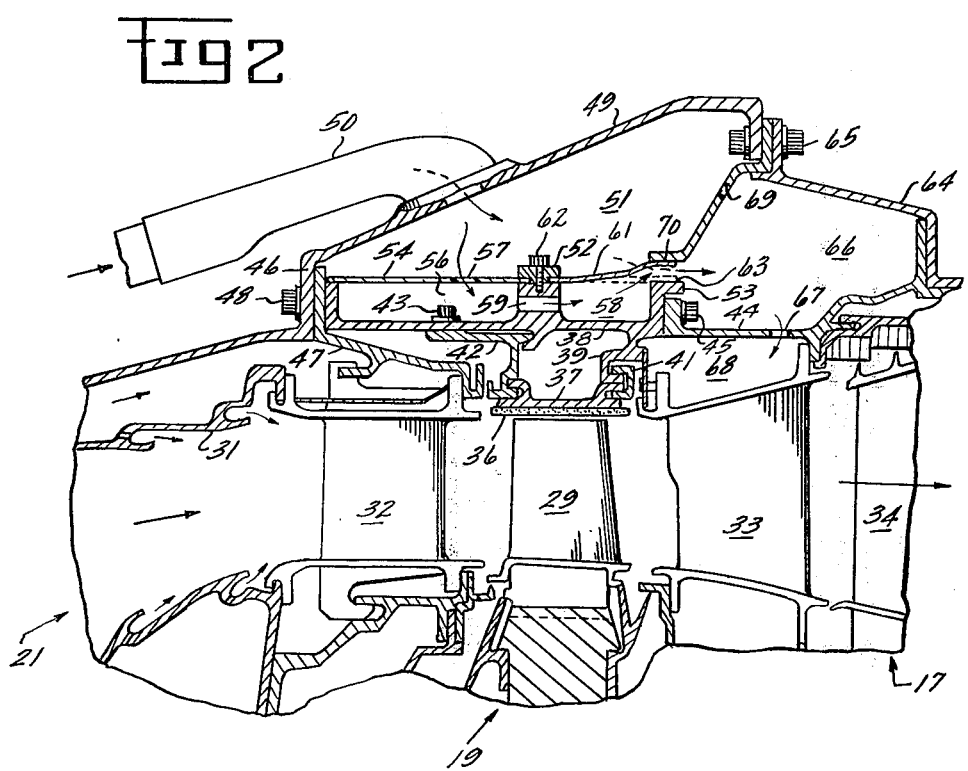
FIG. 2 is a partial sectional view of a turbine portion of the jet engine showing the particular details of the present invention.

Referring now to FIG. 2, the high pressure turbine portion of the engine is shown in greater detail and comprises a single-stage row of rotor blades or buckets 29 rotatably disposed in the flow path of the hot gases as shown by the arrows. The hot gases flow from the annular combustor inner casing 31 rearwardly to a row of circumferentially spaced high pressure nozzles 32, through the circumferentially spaced row of buckets 29, through a circumferentially spaced stationary row of low pressure nozzles 33 to finally impinge on the circumferentially spaced row of rotatable low pressure turbine blades or buckets 34 of the fan turbine 17 and finally to exhaust out the main nozzle 28. Circumscribing the row of high pressure buckets 29 in close clearance relationship therewith is an annular shroud 36 made of a suitable abradable material for closely surrounding the buckets 29 but allowing some frictional engagement and wear at particular operational moments wherein the clearance between the shroud and the blades may be temporarily lost. The shroud is preferably made of a number of annular sectors attached to the inner side of an annular band 37 by conventional means. The annular band 37 is preferably made up of a number of sectors forming a complete circle. The annular band 37 is in turn supported by an annular ring 38 having at its rearward end, a radially inwardly extending collar 39 which is attached to the annular band 37 by way of an annular bracket 41. The forward side of the annular band 37 is attached to the annular ring 38 by way of an L-shaped annular bracket 42 and a plurality of bolts 43. Support for the annular ring 38 is derived by connection to the low pressure nozzle support 44 by bolts 45 at the rear end thereof, and connection to the turbine casing 46 along with the high pressure nozzle support 47 by way of a plurality of bolts 48 spaced circumferentially around the casing.

As the turbine casing 46 extends rearwardly around the high pressure turbine portion of the engine, it is suddenly enlarged by the manifold portion 49 which forms an annular plenum 51 between the manifold and the annular ring 38. Fluidly communicating with the plenum 51 is a plurality of air bleed off conduits 50 which carry bleed off air from the intermediate stages of the compressor 18 for the purpose of turbine nozzle cooling in a manner well known in the art.

Referring now more specifically to the annular ring 38, a radially outwardly extending flange 52 is formed thereon to project outwardly into the plenum 51. Axially spaced in the rearward direction an L-shaped flange 53 also projects radially outward but not to the extent of the outer diameter of the flange 52. The ring 38 with its flanges 52 and 53 is composed of the material having a relatively low coefficient of thermal expansion. Rigidly attached to the flange 52 and projecting forwardly to the turbine casing 46 is a cylindrical structure 54 which surrounds a portion of the annular ring 38 to form a cavity 56 therebetween. A plurality of apertures 57 are formed around the circumference of the cylindrical structure 54 to provide fluid communication between the plenum 51 and the cavity 56. Fluid communication is further provided between the cavity 56 and the area 58 defined by the axially spaced flanges 52 and 53, by a plurality of axially extending holes 59 formed in the flange 52. To further define that area 58 between the two flanges 52 and 53, a cylinder 61 is rigidly attached to the flange 52 by a plurality of bolts 62, and extends axially rearwardly to surround the outer surface 63 of the flange 53. The cylinder 61 is composed of a material having a high thermal coefficient of expansion which reacts with the ring 38 and associated flanges to control the flow of bleed off air in the plenum 51 during transient and steady-state periods of engine operation to obtain the desired state of growth characteristics for the establishment of proper clearances between the shroud 36 and the turbine buckets 29.

At the rearward end of the manifold 49 an annular support structure 64 is attached to the manifold 49 by a plurality of bolts 65 and acts to support the second stage low pressure nozzle 33. The support structure 64 is connected to the stage one nozzle support 44, and together they partially define a secondary plenum 66 which is downstream of and supplied by cooling air from the plenum 51. A plurality of circumferentially spaced holes 67 provide fluid communication between the secondary plenum 66 and the nozzle cavities 68 for cooling of the nozzles in a manner well known in the art. Further defining the secondary plenum 66 is the annular oblique flange 69 connected to the manifold 49 by bolts 65 extending radially inwardly to surround the L-shaped flange 53 at a radially outward spaced position so as to trap one end of the cylinder 61 therebetween. The annular flange 69 and its mechanically connected parts are composed of a material with a relatively low thermal coefficient of expansion. The interaction of the cylinder 61 with the adjacent surfaces of the flange outer surface 63 and the annular oblique flange seat surface 70 acts as a temperature responsive valve which is closed when in the dotted line position and open when in the position shown in FIG. 2.

In a typical operation of an aircraft turbine engine, assume that the aircraft engine is in the idle position. The air entering the plenum 51 is relatively cool since it hasn't been compressed to any great degree, and the cylinder 61 is thus in a relatively contracted position as shown by the dotted lines in FIG. 2 to present a closed valve position. The flow of air from the plenum 51 through the apertures 57 to the annular slot 59 is thus virtually shut off and the air flow pattern tends to be as shown by the dotted line arrows from the plenum 51 to the secondary plenum 66. As the engine is accelerated, for example to maximum thrust position, the degree of compression of the air in the compressor 18 is increased, and the air being delivered to the plenum 51 is relatively hot. This hot air acts on the exposed cylinder 61 to cause it to quickly increase in size. Conversely, the angular ring 38 and its associated flanges 52 and 53 are very slow to respond to this temperature change and when responding they do not expand to the degree that the cylinder 61 expands. The result is that the cylinder unrestricted end expands to the position shown by the solid lines in FIG. 2, to open the valve. The air from the plenum 51 then passes through the apertures 57, the holes 59, into the space 58 and into the plenum 66 as shown by the solid arrows in FIG. 2. Since the air flows past the flanges 52 and 53 and over the ring 38, the hot gases tend to quickly heat up the combined structure and cause it to expand relatively fast to thereby increase the inner diameter of the supported shroud 36. When the speed of the engine is subsequently reduced, as by a throttle chop, the air being delivered to the plenum 51 is again relatively cool and the cylinder 61 quickly responds to the thermal change to shrink back to the dotted position of FIG. 2 and close the valve. The ring 38 and associated flanges 52 and 53 are thus virtually isolated with the hot gases and tend to cool very slowly to thereby bring the shroud 36 down to its shrunken condition at a very low rate. Assuming now that the throttle is again moved to the maximum thrust position (hot rotor burst), the cylinder 61 is again exposed to hot gases and the valve is opened to again cause the support structure to expand relatively fast to increase the size of the shroud enclosing area.

It will, of course, be understood that various other designs and configurations can be employed to achieve the objects of the present invention. For example, the thermal valve, which has been described in terms of the ring 38, cylinder 61 and flange 69, may comprise various other arrangements to bring about the regulation of the shroud support temperature. The "open" and "closed" positions of the valve may be interposed to route the thermal fluid in the desired direction and manner. The fluid may be derived from a location other than the compressor, and its temperature may bear a different relationship from that of being proportional to engine speed as described. Further, the shroud support structure as shown and described is merely illustrative of various structures which could be thermally regulated with respect to size in order to facilitate the desired transient and steady-state radial positions of the shroud.

What is claimed is:

1. An improved gas turbomachine of the type having a relatively high thermal inertia rotor disposed in close clearance relationship within a stator for operation over a range of temperatures and speeds wherein the improvement comprises:
   a. a shroud surrounding a portion of the rotor;
   b. a shroud support for positioning said shroud radially with respect to said rotor, said shroud support having a relatively low thermal inertia and adapted to grow radially outward during periods of machine acceleration and shrink during periods of deceleration; and
   c. valve means responsive to machine acceleration and deceleration for directing a relatively hot fluid medium over said shroud support during periods of machine acceleration and away from said shroud support during periods of machine deceleration so that said shroud support has a relatively fast growth rate and a relatively slow shrinkage rate.

2. An improved gas trubomachine as set forth in claim 1 wherein the temperature of said fluid medium is responsive to turbine speed.

3. An improved gas turbomachine as set forth in claim 1 wherein said fluid medium originates in a compressor portion of the turbomachine.

4. An improved gas turbomachine as set forth in claim 1 wherein said rotor is a turbine rotor and further wherein said portion surrounded by said shroud includes a stage of turbine rotor blades.

5. An improved gas turbomachine as set forth in claim 1 wherein said shroud support includes at least one annular element which fluidly communicates with said fluid medium during specified periods of machine performance.

6. An improved gas turbomachine as set forth in claim 1 wherein said valve is comprised of two metal elements with one metal element being that of the shroud support and the other being an element attached thereto and having a different thermal coefficient of expansion.

7. An improved gas turbomachine as set forth in claim 6 wherein the seat of said valve is formed by a portion of said shroud support.

8. An improved gas turbomachine as set forth in claim 6 wherein said other element is a cylinder having one end attached to said shroud support.

9. An improved gas turbomachine as set forth in claim 8 wherein the other end of said cylinder is removably engageable at its inner side with said shroud seat portion.

10. An improved gas turbomachine of the type having a relatively high thermal inertia rotor disposed in close clearance relationship within a relatively low thermal inertia stator for operation over a range of temperatures and speeds wherein the improvement comprises:
   a. a shroud surrounding a portion of the rotor;
   b. a relatively low thermal inertia shroud support for radially positioning said shroud with respect to said rotor;
   c. means for selectively conducting a relatively hot fluid over said shroud support to cause thermal expansion thereof; and
   d. valve means responsive to the temperature of said thermal fluid to cause operation of said conduction means during periods of machine acceleration and cease operation thereof during periods of machine deceleration.

11. An improved gas turbomachine as set forth in claim 10 wherein said thermal fluid comprises bleed-off air from the compressor portion of the turbomachine.

12. An improved gas turbomachine as set forth in claim 10 wherein said conduction means includes a flow path passing through a portion of said shroud support.

13. An improved gas turbomachine as set forth in claim 10 wherein said shroud support is an annular member and further wherein said conducting means is adapted to conduct said thermal fluid over portions of the outer side thereof.

* * * * *